(12) United States Patent
Yueh

(10) Patent No.: US 11,542,069 B2
(45) Date of Patent: Jan. 3, 2023

(54) PORTABLE BUBBLE WATER BOTTLE AND CONTROL VALVE THEREOF

(71) Applicants: Oivita Creative Co., Ltd., Taipei (TW); Chao-Yu Yueh, Taipei (TW)

(72) Inventor: Chao-Yu Yueh, Taipei (TW)

(73) Assignees: OIVITA CREATIVE CO., LTD., Taipei (TW); Chao-Yu Yueh, Taipei (TW)

( * ) Notice: Subject to any disclaimer, the term of this patent is extended or adjusted under 35 U.S.C. 154(b) by 394 days.

(21) Appl. No.: 16/716,804

(22) Filed: Dec. 17, 2019

(65) Prior Publication Data

US 2020/0198846 A1   Jun. 25, 2020

(30) Foreign Application Priority Data

Dec. 21, 2018   (TW) .................................. 107146339

(51) Int. Cl.
| | |
|---|---|
| *F16K 11/087* | (2006.01) |
| *B65D 43/02* | (2006.01) |
| *A45F 3/16* | (2006.01) |
| *B01F 23/2361* | (2022.01) |
| *B65D 85/73* | (2006.01) |
| *B01F 23/237* | (2022.01) |

(52) U.S. Cl.
CPC .............. *B65D 43/02* (2013.01); *A45F 3/16* (2013.01); *B01F 23/23611* (2022.01); *B65D 85/73* (2013.01); *F16K 11/0873* (2013.01); *B01F 23/237621* (2022.01)

(58) Field of Classification Search
CPC ............. F16K 11/0873; F16K 11/0876; Y10T 137/86871; Y10T 137/86863; A45F 3/16; A45F 3/18; A45F 3/20; A45F 2003/163; A45F 2003/166; A45F 2003/205; B01F 23/236–2364; B01F 23/23762; B01F 23/237621; B01F 35/71805; B01F 35/718051; B65D 85/73; A47J 31/40; A47J 31/4403; A47J 31/4407; A47J 31/58
USPC ........ 137/625.46, 625.47; 261/38–71, 121.4, 261/126, DIG. 7; 220/203.21; 141/17, 141/19, 70, 301, 302, 320, 329, 330
See application file for complete search history.

(56) References Cited

U.S. PATENT DOCUMENTS

| | | | |
|---|---|---|---|
| 535,366 A * | 3/1895 | Field ...................... | B01D 35/12 |
| | | | 210/333.1 |
| 1,899,826 A * | 2/1933 | Rice ........................ | F16K 11/12 |
| | | | 210/454 |

(Continued)

*Primary Examiner* — Craig J Price
(74) *Attorney, Agent, or Firm* — McClure, Qualey & Rodack, LLP

(57) ABSTRACT

A portable bubble water bottle includes a shell, a separation tank, a bottom cover, and a gas supply device. A liquid storage space and a gas supply space are individually defined on the upper and the lower sides of the separation tank. A hole is defined on the separation tank to connect the liquid storage space and the gas supply space. The gas supply device includes a gas cylinder and a control valve in the gas supply space. The opening of the gas cylinder is toward the bottom. The gas is transferred from the gas cylinder, through the control valve and the hole of the separation tank, to the liquid storage space. The invention has the advantages of increasing the dissolved gas in liquid, great safety in use, easy operation, reducing the gas escape rate, and customization in use.

5 Claims, 9 Drawing Sheets

(56) References Cited

U.S. PATENT DOCUMENTS

| | | | | |
|---|---|---|---|---|
| 4,441,524 A | * | 4/1984 | Mese | F16K 5/0689 |
| | | | | 251/315.12 |
| 7,059,349 B2 | * | 6/2006 | Breda | F16K 11/0856 |
| | | | | 137/625.11 |
| 7,887,024 B2 | * | 2/2011 | Timko | F16K 5/0668 |
| | | | | 251/315.08 |
| 2001/0045231 A1 | * | 11/2001 | Monod | F16K 27/067 |
| | | | | 137/454.2 |

* cited by examiner

PORTABLE BUBBLE WATER BOTTLE AND CONTROL VALVE THEREOF

CROSS REFERENCE TO RELATED APPLICATIONS

This Non-provisional application claims priority under 35 U.S.C. § 119(a) on Patent Application No. 107146339 filed in Taiwan on Dec. 21, 2018, the entire contents of which are hereby incorporated by reference.

BACKGROUND

1. Technical Field

This invention relates to a bubble water bottle, in particular, to a portable bubble water bottle and control valve thereof.

2. Description of Related Art

As the advantages of drinking bubble water are raised, drinking bubble water is increasingly popular among the public, apart from purchasing bubble water, the practitioner also has developed the bubble water machine to allow the public to make bubble water at home.

Refer to FIG. 1, the prior bubble water machine 40 mainly consists of a cabinet 41, a gas bottle 42, a cup 43 and a gas-guide tube 44. The gas bottle 42 is filled with carbon dioxide, and installed at one side of the cabinet 41. The cup 43 can be placed at another side of the cabinet 41, and the cup 43 is connected to the gas bottle 42 by the gas-guide tube 44. The gas-guide tube 44 is dipped into the cup 43 to mix carbon dioxide gas in the gas bottle 42 with water in the cup 43 and thus to make bubble water. At last, the cup 43 is taken out of the cabinet 41, and then the user can drink the bubble water in the cup 43 directly or pour into other container for drinking.

Due to the bubble water machine 40 will take up a fixed space, some practitioners also launch the convenience bubble water bottle. Refer to FIG. 2, the prior bubble water bottle 50 mainly consists of a cover 51, a cup 52, a gas-guide tube 53 and a gas bottle 54. The cover 51 is connected to the cup 52, besides, the gas-guide tube 53 extends into the cup 52 via the cover 51. The gas bottle 54 is connected to one end of the gas-guide tube 53 exposed outside the cover 51 to mix carbon dioxide gas in the gas bottle 54 with water in the cup 52 and thus to make bubble water.

However, the gas bottle 54 is exposed outside while using convenience bubble water bottle 50. If the user collides against the gas bottle 54 by accident while using the bubble water bottle 50, it may lead to the detachment of connection between the gas bottle 54 and gas-guide tube 53. The gas bottle 54 is filled with high pressure gas, so that the gas bottle 54 may be jetted to some place with high speed when the gas bottle 54 is detached from the gas-guide tube 53, thus causing danger.

Additionally, in the conventional, the gas-guide tubes 44 and 53 of the bubble water machine 40 and the bubble water bottle 50 are extended into the central of the cups 43 and 52. Due to the bubbles are subject to upward buoyancy in the liquid, the water located above the outlets of the gas-guide tubes 44 and 53 can be mixed well with carbon dioxide gas, resulting in poor gas-dissolving effect.

Therefore, it is one of the important subjects to provide a portable bubble water bottle and its control valve to take convenience and safety into consideration.

SUMMARY OF THE INVENTION

In view of the foregoing, the invention is to provide a portable bubble water bottle, wherein the opening of the gas supply device is disposed at the lower edge of the liquid storage space, so that the shell of the bubble water bottle can be used to protect the gas cylinder and improve the efficiency and safety of gas-liquid mixing.

To achieve the above object, the present invention provides a portable bubble water bottle, consisting of a shell, a separation tank, a bottom cover and a gas supply device. A drinking part, a bottle wall and an assembly part are individually defined from the top to the bottom of the shell. The separation tank is disposed below the shell, and a control valve tank and a gas cylinder tank are defined from the outside to the inside of the separation tank. A connecting hole is disposed on the control valve tank and the gas cylinder tank is concaved toward the direction of the drinking part, and the upper part of the separation tank and the inside of the shell jointly define a liquid storage space. The bottom cover covers the separation tank and the assembly part of the shell from the bottom, and the upper part of the bottom cover and the lower part of the separation tank jointly define a gas supply space. The gas supply device includes a gas cylinder and a control valve in the gas supply space. And the gas cylinder is disposed in the gas cylinder tank with the opening toward the bottom. The control valve is disposed in the control valve tank and includes a gas inlet and a gas outlet. The opening of the gas cylinder is connected to the gas inlet of the control valve and the gas outlet of the control valve is connected to the connecting hole at the bottom of the liquid storage space.

In one embodiment of the invention, wherein the control valve includes a main body, a path selection assembly, a shell body and a cover body. The main body includes a top part and a bottom part, which are disposed opposite to each other, and a middle part between the top part and the bottom part. The middle part is provided with a rounded part and a holding space which are adjacent to each other, and the rounded part and the holding space are communicated by a through hole. The path selection assembly includes a first channel and a second channel, and the path selection assembly is disposed in the holding space of the main body. The shell body is provided with a control valve inlet, a control valve outlet, a first space and a second space which are adjacent to each other. The control valve inlet is to communicate the first space with the outside and the control valve outlet is to communicate the second space with the outside. The main body is disposed in the first space of the shell body, and the rounded part of the main body together with the shell body form a fluid pre-storage space. The cover body is disposed corresponding to the first space of shell body to seal the first space. The path selection assembly can be adjusted at least in three positions, when the path selection assembly is in a first position, the control valve outlet, the second channel and the fluid pre-storage space are in communicated; when the path selection assembly is in a second position, the control valve inlet, the first channel and the control valve outlet are in communicated; and when the path selection assembly is in a third position, the fluid pre-storage space, the second channel and the control valve inlet are in communicated.

In one embodiment of the invention, the path selection assembly is provided with a connecting part, which is disposed on the side facing the cover body, while a control assembly is connected with the connecting part by passing through the cover body and the main body.

In one embodiment of the invention, the path selection assembly is present as spherical.

In one embodiment of the invention, the control valve further comprises a first limit assembly and a second limit assembly which are disposed opposite to each other in the holding space, wherein the path selection assembly is disposed between the first limit assembly and the second limit assembly.

In one embodiment of the invention, the control valve further includes a fixing assembly, which is disposed corresponding to the holding space to seal the holding space.

In one embodiment of the invention, the portable bubble water bottle further includes an upper cover, which is detachably connected to the drinking part of the shell to seal the liquid storage space. Additionally, the upper cover can be connected to the drinking part of the shell by screwing, pivoting, snapping or a combination of the above.

In summary, the control valve outlet of the portable bubble water bottle in the present invention is connected to the connecting hole at the bottom of the liquid storage space, which greatly increases the dissolved gas in liquid. Secondly, since the opening of the gas cylinder in the present invention is disposed in the gas cylinder tank toward the bottom, which greatly improves the safety in using the bubble water bottle. Furthermore, the upper cover and the bottom cover of the present invention are detachably connected to the shell for easy operation. In addition, the control valve of the present invention is designed to mix gas and liquid in several times to maintain the dissolved gas of bubble water.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Figure 1:
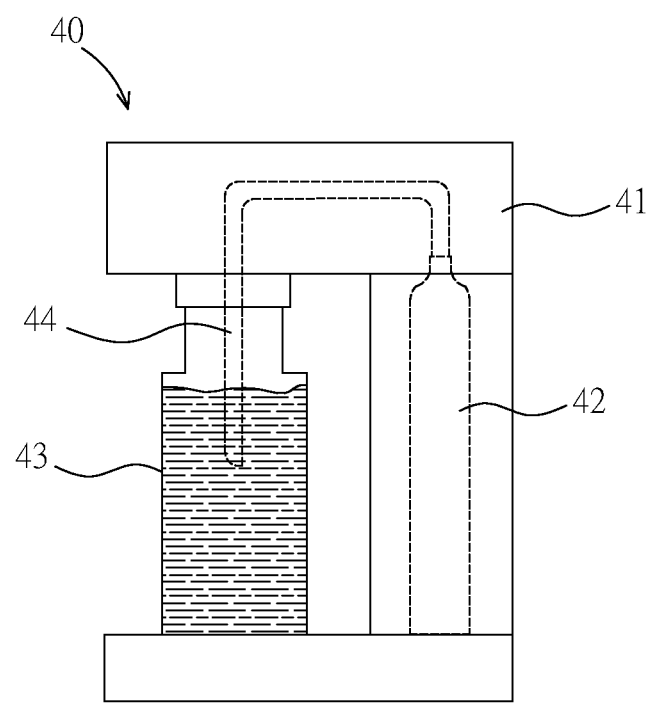
FIG. 1 is a schematic diagram showing a conventional bubble water machine.
Figure 2:
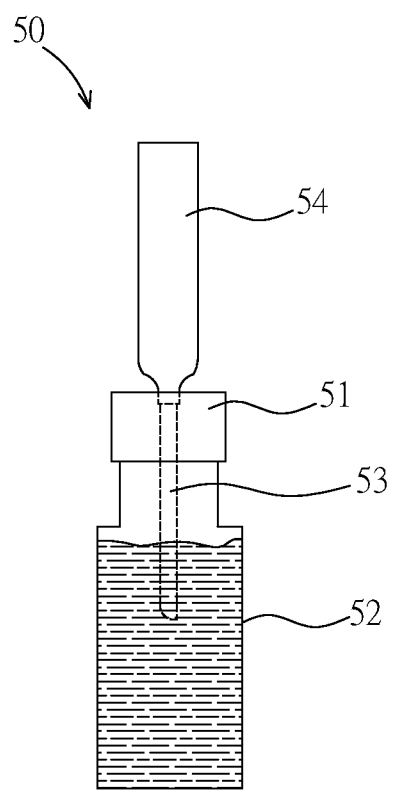
FIG. 2 is a schematic diagram showing a conventional bubble water bottle.

Reference will now be made to the drawings to describe various inventive embodiments of the present disclosure in detail, wherein like numerals refer to like elements throughout.

As shown in FIGS. 3 to 6, the portable bubble water bottle 100 of the first embodiment in the present invention comprises a shell 110, a separation tank 130, an upper cover 102, a bottom cover 106 and a gas supply device 150.

The shell 110 is essentially cylindrical and is defined with a drinking part 111, a bottle wall 112 and an assembly part 113 from the top to the bottom. The drinking part 111 of the shell 110 has a drinking edge 114 formed by the edge of the shell 110. The bottle wall 112 of the shell 110 is to connect the assembly part 113 and the drinking part 111, and the assembly part 113 includes an opening 115. In this embodiment, the assembly part 113 is formed by extending along the circumference of the bottle wall 112 of the shell 110.

The separation tank 130 is disposed at the lower part of the shell 110 and is defined with a control valve tank 132 and a gas cylinder tank 134 from the outside to the inside, and a connecting hole 132a is disposed on the control valve tank 132. The gas cylinder tank 134 is concaved toward the drinking part 111. The upper part of the separation tank 130 and the inner side of the shell 110 jointly define the liquid storage space SP1. The control valve tank 132 is adjacent to the bottom edge of the assembly part 113 of the shell 110.

Figure 3:
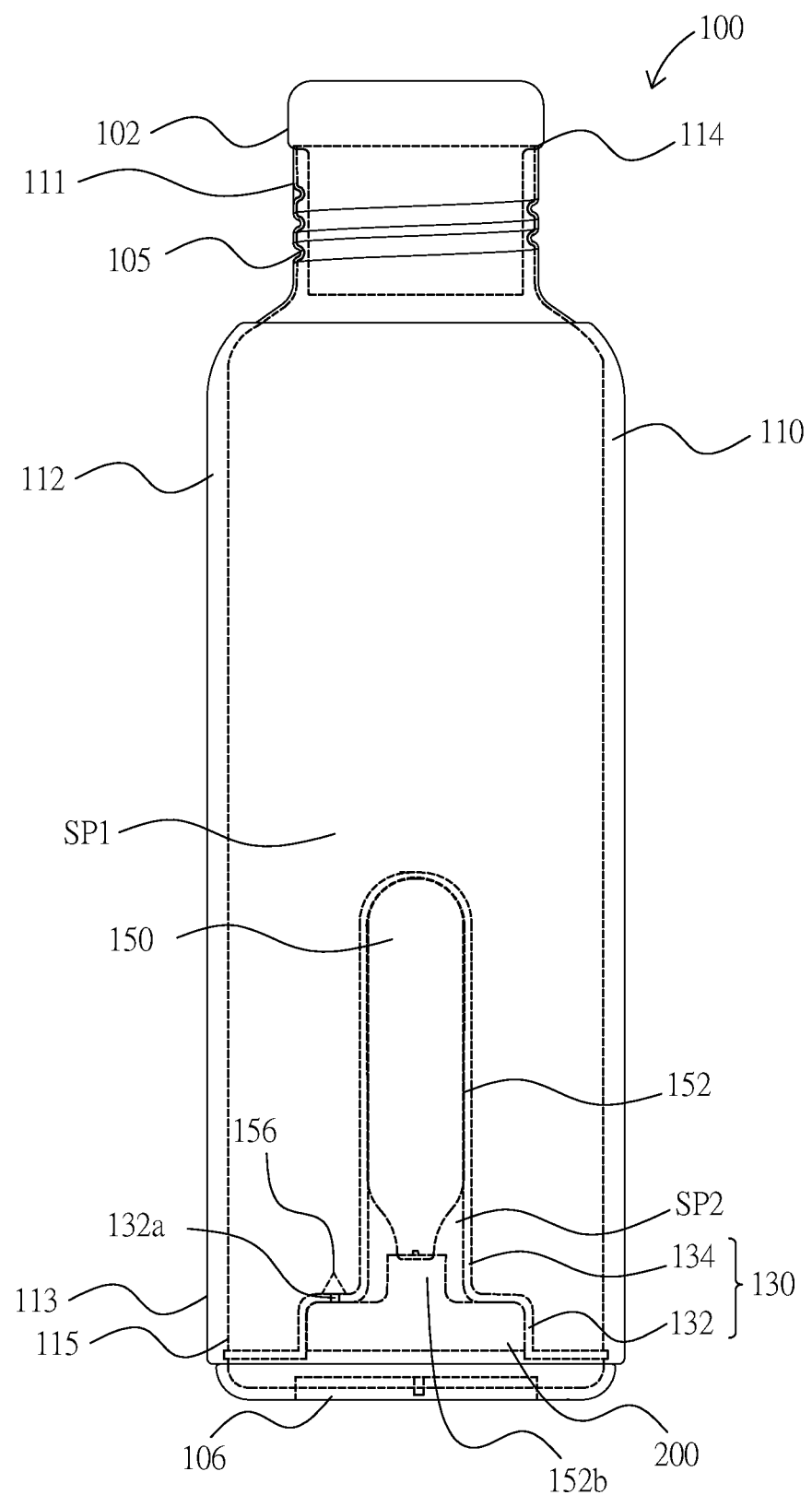
FIG. 3 is a perspective diagram showing a portable bubble water bottle according to an embodiment of the invention.
Figure 4:
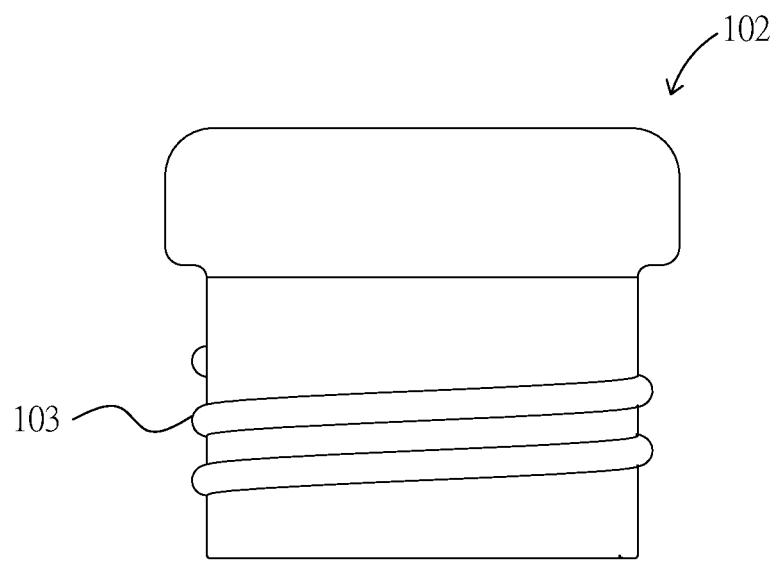
FIG. 4 is a schematic diagram showing an upper cover of the portable bubble water bottle according to the embodiment of the invention.

The upper cover 102 is connected to the drinking part 111 of the shell 110. In this embodiment, the upper cover 102 is assembled by screw and is detachably connected to the drinking part 111 of the shell 110 to seal the liquid storage space SP1. In particular, the upper cover 102 of the embodiment includes an external thread surface 103 (as shown in FIG. 4), while the drinking part 111 of the shell 110 includes a corresponding internal thread surface 105 (as shown in FIG. 3). The user can fit the external thread surface 103 and the internal thread surface 105 by rotating, and screw the upper cover 102 in or out of the drinking part 111 of the shell 110, wherein the outer diameter formed by the external thread surface 103 of the upper cover 102 is smaller than the inner diameter formed by the internal thread surface 105 of the drinking part 111.

Figure 5:
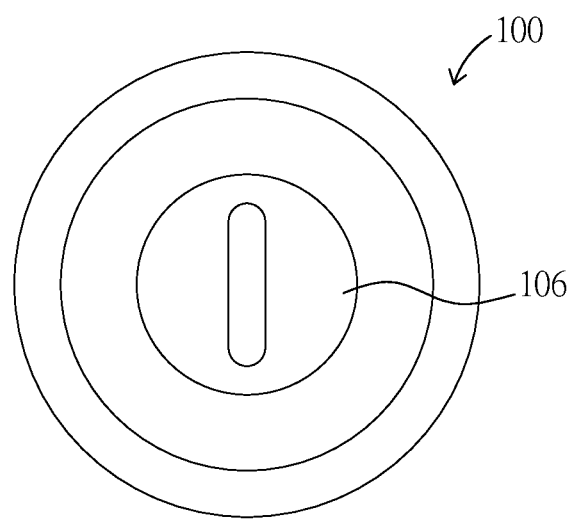
FIG. 5 is a bottom view showing the portable bubble water bottle according to an embodiment of the invention.
Figure 6:
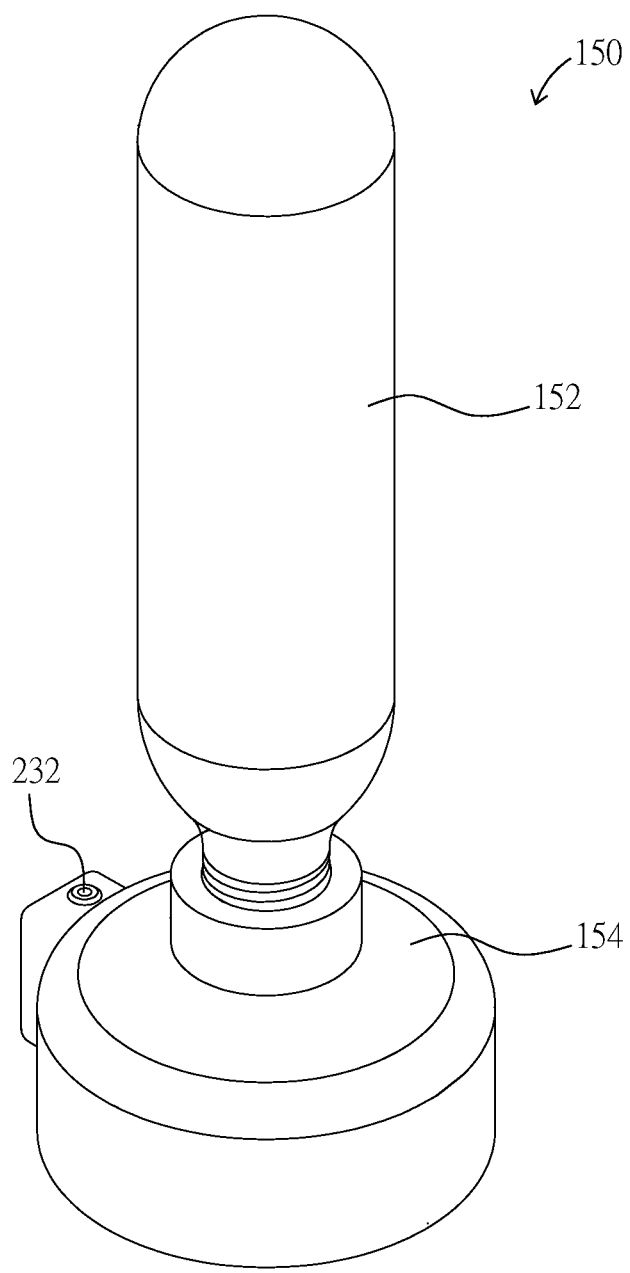
FIG. 6 is a stereogram showing a gas supply device of the portable bubble water bottle according to the embodiment of the invention.

The bottom cover 106 covers the assembly part 113 (as shown in FIG. 5) of the separation tank 130 and the shell 110 from below, and the upper part of the bottom cover 106 and lower part of the separation tank 130 jointly define the gas supply space SP2. The bottom cover 106 is detachably connected to the assembly part 113 of the shell 110. The bottom cover 106 and the separation tank 130 can seal the gas supply space SP2 by the combination of the bottom cover 106 and the shell 110. In this embodiment, the volume of the gas supply space SP2 is smaller than the volume of the liquid storage space SP1. And the bottom cover 106 and the assembly part 113 of the shell 110 in this embodiment are also screwed together. Among them, rubber (not shown in the figure) and other materials with greater friction force can be used between the bottom cover 106 and the shell 110 for tight coupling. The user can screw the bottom cover 106 in or out of the assembly part 113 of the shell 110 by rotating.

When the bottom cover 106 is connected with the shell 110, the separation tank 130 is fixed firmly in it, and accordingly the separation tank 130 can fix the gas supply device 150 in the gas supply space SP2 at right position, so as to avoid the displacement of the gas supply device 150 in the gas supply space SP2.

The gas supply device 150 is disposed in the gas supply space SP2 and includes the gas cylinder 152 and the control valve 200. The gas cylinder 152 includes a gas outlet 152b and is disposed in the gas cylinder tank 134 with the gas outlet 152b toward the bottom. Among them, the so-called toward the bottom means that the gas outlet 152b of the gas cylinder is away from the drinking part 111 and is disposed toward the bottom cover 106. In this embodiment, the gas cylinder 152 is filled with compressed liquid carbon dioxide.

When the bottom cover 106 is connected with the shell 110, the separation tank 130 is fixed in it, and accordingly the gas cylinder tank 134 can fix the position of the gas cylinder 152, meanwhile the control valve tank 132 can fix the position of the control valve 200 to avoid the displacement of the gas cylinder 152 and the control valve 200 in the gas supply space SP2.

The control valve 200 is disposed in the control valve tank 132 to release the gas in the gas cylinder 152, for example, only a certain amount of gas can pass through in each action. Please refer to FIGS. 7, 8A and 8B below for further illustration of the structure of the control valve 200.

Figure 7:
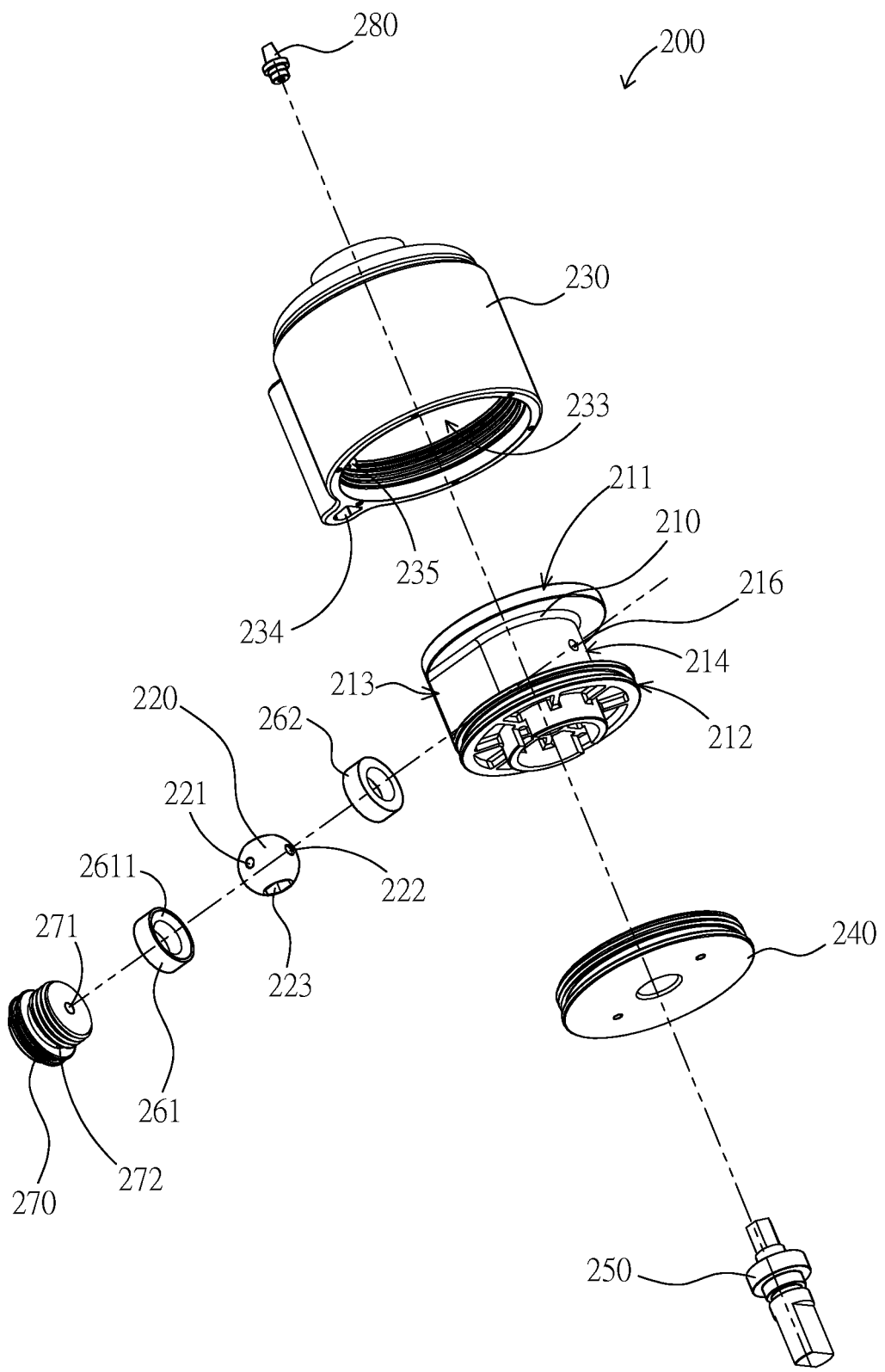
FIG. 7 is an exploded view showing the control valve of the portable bubble water bottle according to the embodiment of the invention.

As shown in FIG. 7, the control valve 200 includes a main body 210, a path selection assembly 220, a shell body 230, a cover body 240, a control assembly 250, a first limit assembly 261, a second limit assembly 262, a fixing assembly 270 and a lancet 280. The material of control valve 200 can be selected from metal and alloy that are not easily oxidized or plastic with high pressure resistance (within 2000 psi).

Figure 8A:
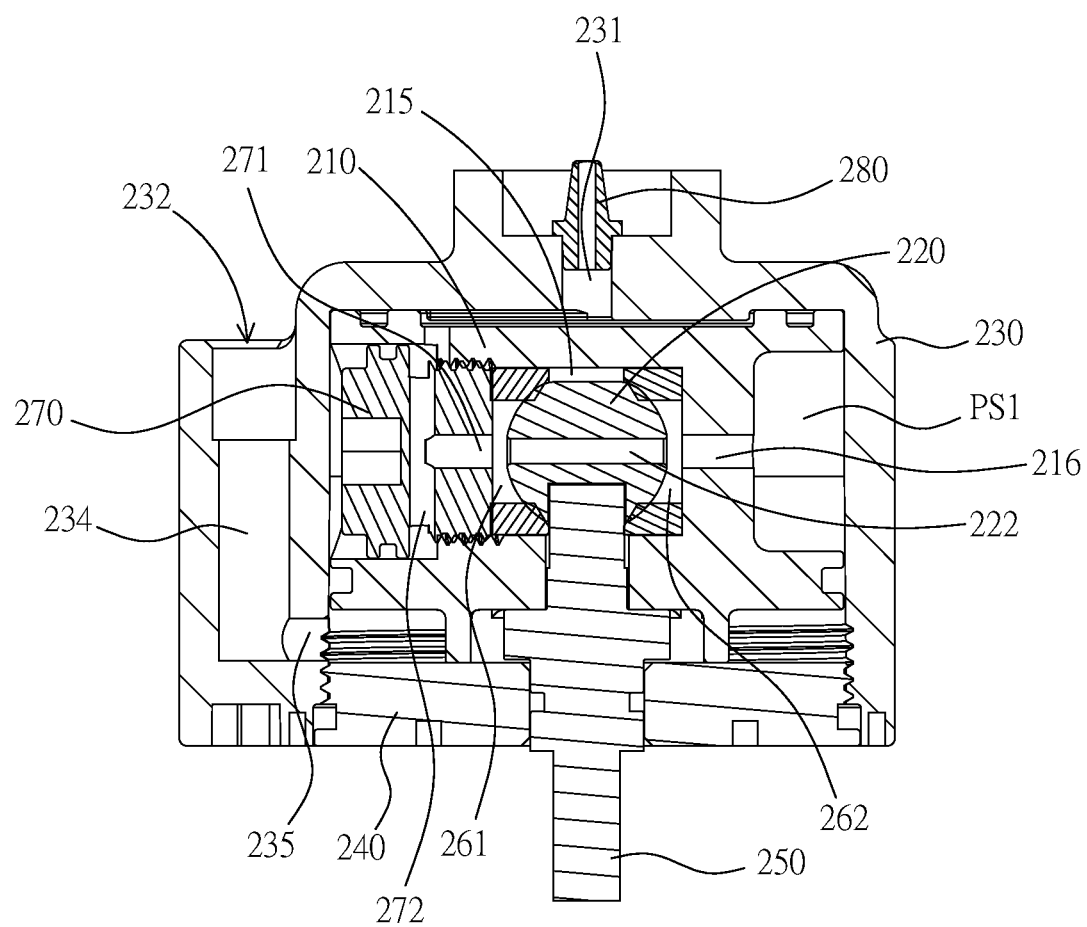
FIGS. 8A, 8B and 9 are section view showing the control valve of the portable bubble water bottle according to the embodiment of the invention.

The main body 210 is provided with a top part 211 and a bottom part 212 which are disposed opposite to each other, and a middle part 213 between the top part 211 and the bottom part 212. The overall appearance of the main body 210 is similar to a cylinder. The middle part 213 includes a rounded part 214 and a holding space (as shown in FIG. 8A) 215 which are adjacent to each other, and the rounded part 214 and the holding space 215 are communicated by a through hole 216. In this embodiment, the rounded part 214 refers to the part of the middle part 213 that is retracted between the top part 211 and the bottom part 212, which may have different forms.

The path selection assembly 220 includes a first channel 221, a second channel 222 and a connecting part 223. And the path selection assembly 220 is disposed in the holding space 215 of the main body 210. After the path selection assembly 220 is installed in the holding space 215, the connecting part 223 is disposed on the side facing the cover body 240, and a control assembly 250 is connected with the connecting part 223 by passing through the cover body 240 and the main body 210. The path selection assembly 220 may rotate together with the control assembly 250 by turning the control assembly 250. In this embodiment, the path selection assembly 220 may be present as spherical or cylindrical, with the main purpose of being able to rotate in the holding space 215.

The first limit assembly 261 and the second limit assembly 262 are disposed in the holding space 215, and the path selection assembly 220 is disposed between the first limit assembly 261 and the second limit assembly 262. In this embodiment, the first limit assembly 261 includes an arc-shaped first limit contact surface 2611, and the second limit assembly 262 includes an arc-shaped second limit contact surface (not shown in the figure), wherein the spherical path selection assembly 220 is limited to move only between the first limit contact surface 2611 and the second limit contact surface.

The fixing assembly 270 is disposed corresponding to the holding space 215 to enclose the first limit assembly 261, the path selection assembly 220 and the second limit assembly 262 in the holding space 215. The fixing assembly 270 may also include an inlet guide 271 and an outlet guide 272 which are mutually communicated. Wherein, the inlet guide 271 is disposed toward the direction of the path selection assembly 220.

The shell body 230 is provided with a control valve inlet 231, a control valve outlet 232, a first space 233 and a second space 234 which are adjacent to each other, wherein the first space 233 and the second space 234 are communicated by the through hole 235.

The control valve inlet 231 is to connect the first space 233 with the outside, wherein, the control valve inlet 231 is connected with the lancet 280, and the lancet 280 is used to pierce the gas cylinder 152, so that the carbon dioxide in the gas cylinder 152 can enter the control valve 200 through the lancet and the control valve inlet 231.

The control valve outlet 232 is to connect the second space 234 with the outside, wherein the control valve outlet 232 can be disposed corresponding to the connecting hole 132a, so that the carbon dioxide can enter the liquid storage space SP1 through the control valve outlet 232.

The main body 210 is disposed in the first space 233 of the shell body 230, and the rounded part 214 of the main body 210 and the shell body 230 jointly form a fluid pre-storage space PS1 (as shown in FIG. 8A), which can temporarily store the carbon dioxide of the gas cylinder 152, and choose to output only the carbon dioxide of the fluid pre-storage space PS1 subsequently for quantitative gas output.

The cover body 240 is disposed corresponding to the first space 233 of the shell body 230 to seal the main body 210 in the first space 233.

Figure 8B:
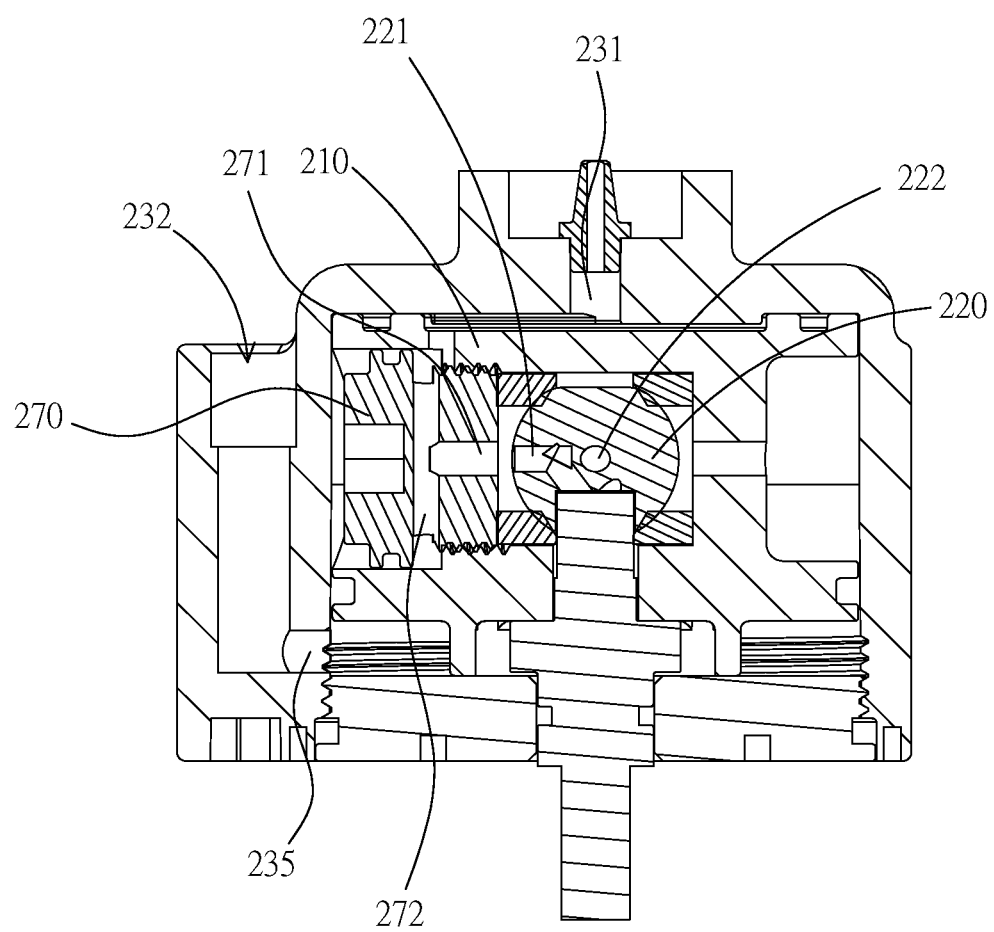

As shown in FIGS. 8A and 8B, the position of the path selection assembly 220 can be adjusted between the first limit assembly 261 and the second limit assembly 262. As shown in FIG. 8A, when the path selection assembly 220 is in a first position, the fluid pre-storage space PS1, the second channel 222 and the control valve outlet 232 are communicated, wherein the gas flows from the second channel 222 to the control valve outlet 232 through the inlet guide 271, the outlet guide 272 of the fixing assembly 270 and then the through hole 235. Since the gas in the control valve is under high pressure, in other embodiments, the gas can flow through the unsealed gap between the second channel 222 and the control valve outlet 232, for example, the gas can flow to the control valve outlet 232 through the gap between the fixing assembly 270, the first limit assembly 261 and the main body 210, and then the through hole 235.

In addition, as shown in FIG. 8B, when the path selection assembly is in a second position, the control valve inlet 231, the first channel 221 and the control valve outlet 232 are communicated. As mentioned, the high-pressure gas can flow through the gap of the structure, so the gas can enter the first channel 221 through the gap of the path selection assembly 220 and the main body 210, and then flow to the control valve outlet 232 through the inlet guide 271, the outlet guide 272 of the fixing assembly 270 and then the through hole 235.

Furthermore, when the path selection assembly 220 is in a third position, the control valve inlet 231, the first channel 221 and the fluid pre-storage space PS1 are communicated (not shown in the figure). Finally, when the path selection assembly 220 is in a fourth position, the gas in the control valve 200 is in a non-flowing state, that is, a closed state, and the gas is kept stably in the control valve 200 and the gas cylinder 152, instead of flowing to the control valve outlet 232.

In addition, please refer to FIG. 3 again, in order to avoid the liquid in the liquid storage space SP1 flow to the control valve 200, the portable bubble water bottle further includes a one-way control valve 156, which is disposed at the bottom of the liquid storage space SP1 and connects the liquid storage space SP1 and the gas supply space SP2 (FIG. 3). In this embodiment, the one-way control valve 156 is a check valve, which is connected to the outlet of the control valve 200, so that the gas can flow from the gas supply space SP2 to the liquid storage space SP1, but the liquid in the liquid storage space SP1 cannot flow to the gas supply space SP2.

When assembling or replacing the gas cylinder 152, the user can first remove the bottom cover 106 from the shell 110, and then take out the assemblies like the control valve 200 and the gas cylinder 152 from the shell 110, and then install the new gas cylinder 152 and the control valve 200. In the embodiment, the assemblies such as the shell 110, the separation tank 130, the upper cover 102, the bottom cover 106 and the gas supply device 150 can be disassembled for cleaning or replacement. While in other embodiments, the shell 110 and the separation tank 130 can be fixed to each other.

In actual use, the liquid storage space SP1 is generally used to hold water, juice, tea or alcoholic beverages. After the upper cover 102 is connected with the shell 110 to seal the liquid storage space SP1, the carbon dioxide in the cylinder 152 enters the liquid storage space SP1 through the one-way valve 156 to mix with the liquid in the liquid storage space SP1 and dissolve to produce the bubble drink.

Figure 9:
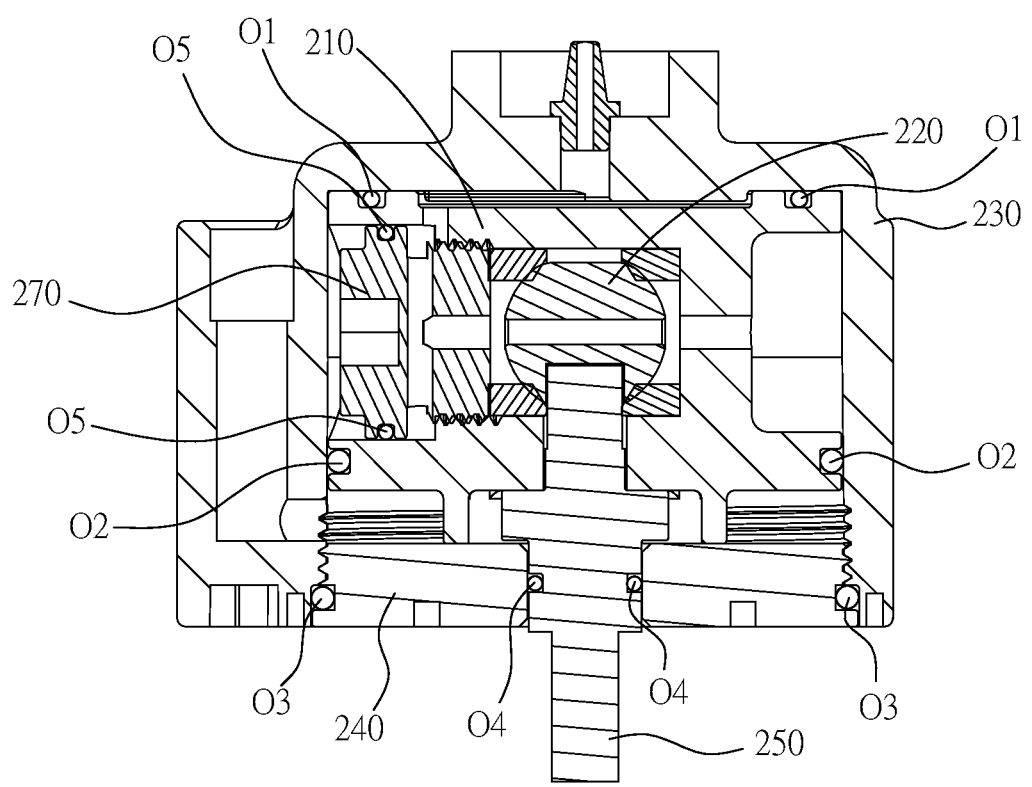

In addition, a gas tight ring (o-ring) can be further disposed in the control valve 200 to seal the necessary parts. As shown in FIG. 9, for example, the gas tight rings O1 and O2 are disposed between the shell body 230 and the main body 210, the gas tight ring O3 is disposed between the shell body 230 and the cover body 240, the gas tight ring O4 is disposed between the cover body 240 and the control assembly 250, and the gas tight ring O5 is disposed between the fixing assembly 270 and the main body 210. Certainly, in other embodiments, the gas tight ring can be further designed according to the requirements, which is not limited hereof.

The portable bubble water bottle 100 of the present invention can further have other structures, for example, the upper cover 102, the bottom cover 106 and the shell 110 can be assembled by means of pivoting, clamping or locking, etc., which is not described here one by one.

The present invention has the following advantages. Firstly, the control valve outlet of the portable bubble water bottle is connected to the connecting hole at the bottom of the liquid storage space, so the gas starts to mix with the liquid from the bottom of the liquid storage space. By using the upward buoyancy of bubbles, the liquid in the whole liquid storage space can be fully mixed with the gas and greatly increase the dissolved gas in liquid. Secondly, because the opening of gas cylinder in the present invention is disposed toward the bottom in the gas cylinder tank, the whole portable bubble water bottle can be used to strengthen the covering of gas supply space for holding the gas cylinder and enhance the safety in use. Moreover, the upper cover and the bottom cover are detachably connected to the shell by means of screwing, pivoting and clamping, so that it is easy to open and close with the covers not easy to be lost.

In addition, with the design of the control valve, the gas and liquid can be mixed in several times with no need of using out the gas in the cylinder at one time. Accordingly, a single gas cylinder of the present invention can be used for multiple times for a portable bubble water bottle. Take a portable bubble water bottle with a capacity of 600 ml as an example, a gas cylinder can provide sufficient dissolved gas for 1800 ml liquid, that is, a gas cylinder can mix with full bottle of water for three times. In this way, just one portable bubble water bottle can satisfy the water intake for an adult in one day, and there is no need to worry about mixing 1800 ml bubble water at a time and carrying it out, which will let bubbles in the water dissipate and disappear along with the cover opening at drinking, and bring the trouble of excessive weight. Besides, since the gas release can be continuously controlled by the user manually, the user can adjust the gas-liquid mixture according to their needs or preferences to realize customization in use.

In conclusion, the present invention has the advantages of increasing dissolved gas in liquid, great safety in use, easy operation, gas dissolved in several times, easy carrying, reducing gas escape rate, and customization in use.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A control valve of a portable bubble water bottle, comprising:
    a main body, which has a top part, a bottom part and a middle part, wherein the top part and the bottom part are disposed opposite to each other, the top part and the bottom part are a protruding rounded flange, respectively, the middle part is disposed between the top part and the bottom part and a part of the middle part to form a rounded part, a holding space is within the main body and communicates with the rounded part by a through hole;
    a path selection assembly, which has a first channel and a second channel, and the path selection assembly is disposed in the holding space of the main body;
    a shell body, which has a control valve inlet, a control valve outlet, a first space and a second space, which are adjacent to each other, the control valve inlet is to communicate the first space with an outside and the control valve outlet is to communicate the second space with the outside, the main body is disposed in the first space of the shell body, and the rounded part of the main body together with the shell body form a fluid pre-storage space; and
    a cover body, which is disposed corresponding to the first space of the shell body to seal the first space,
    wherein the control valve outlet, the second channel and the fluid pre-storage space are in communication when the path selection assembly is in a first position,
    wherein the control valve inlet, the first channel and the control valve outlet are in communication when the path selection assembly is in a second position.

2. The control valve of claim 1, wherein the path selection assembly further comprises a connecting part, which is disposed on a side facing the cover body, while a control assembly is connected with the connecting part by passing through the cover body and a wall of the main body.

3. The control valve of claim 1, wherein the path selection assembly has a spherical circumference.

4. The control valve of claim 3, further comprising:
a first limit assembly, which is disposed in the holding space; and
a second limit assembly, which is disposed opposite to the first limit assembly in the holding space,
wherein the path selection assembly is disposed between the first limit assembly and the second limit assembly.

5. The control valve of claim 3, further comprising:
a fixing assembly, which is disposed corresponding to the holding space to seal the holding space.

* * * * *